Jan. 2, 1951

L. L. GRANT

AUTOMATIC RAISING AND LOWERING TRAVELING SAW MACHINE 2,536,437

Filed Nov. 29, 1946

Inventor
Lester L. Grant
By Geo E Kirk
Attorney

Jan. 2, 1951
L. L. GRANT
2,536,437
AUTOMATIC RAISING AND LOWERING
TRAVELING SAW MACHINE
Filed Nov. 29, 1946
2 Sheets-Sheet 2
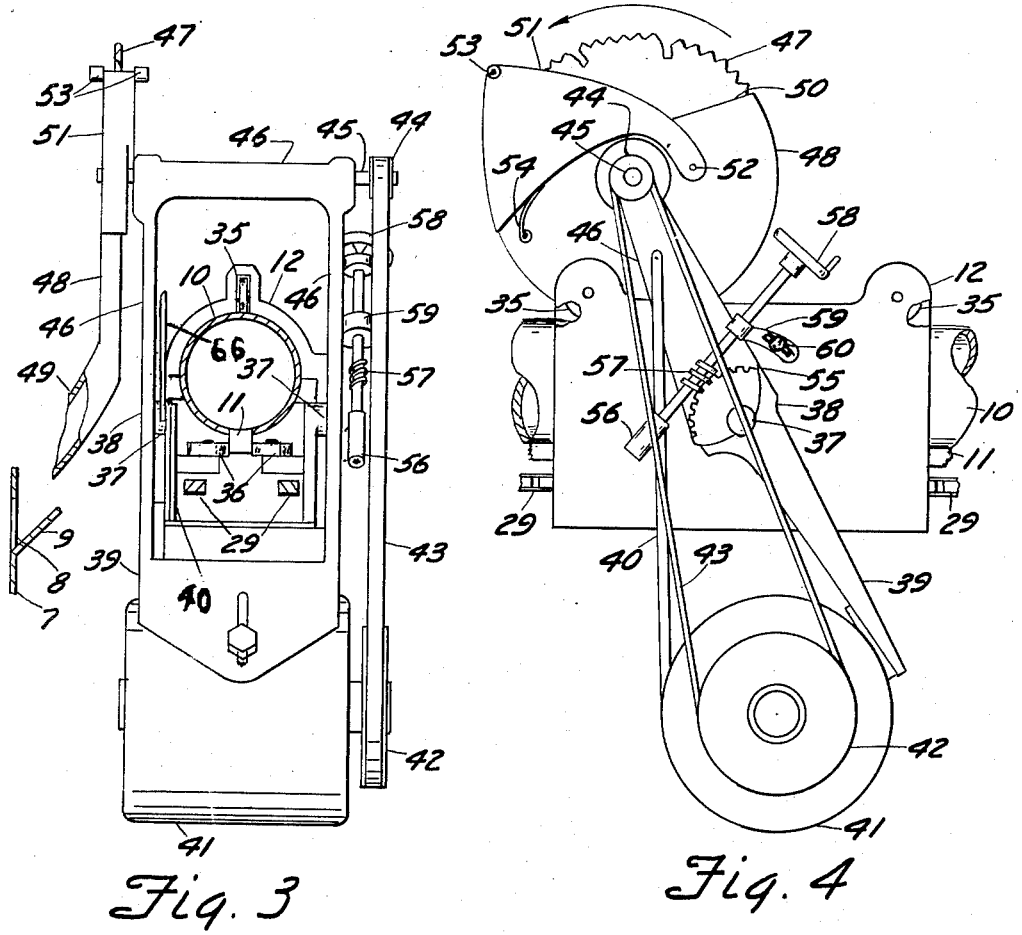
Fig. 3
Fig. 4
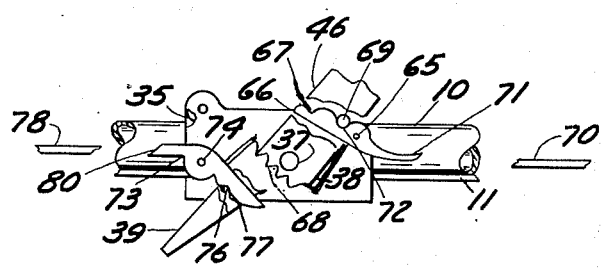
Fig. 5
Inventor
Lester L. Grant
By Geo E Kirk
Attorney Patented Jan. 2, 1951

2,536,437

UNITED STATES PATENT OFFICE 2,536,437

AUTOMATIC RAISING AND LOWERING TRAVELING SAW MACHINE

Lester L. Grant, Napoleon, Ohio

Application November 29, 1946, Serial No. 712,912

2 Claims. (Cl. 143—47)

This invention relates to power driven equipment, more particularly for cutting or finishing operations, in providing cycle of operations therefor.

This invention has utility when incorporated in an electric motor drive disk type of saw. A support or table locates adjustably and controls saw traverse in effecting successive cuttings, say of thin sheet stock, such as plywood, pressboard, wall board and the like.

Referring to the drawings:

Fig. 3 is a section on an enlarged scale on the line III—III, Fig. 2, looking in the direction of the arrows, showing the assembly of the saw and motor upon the mounting rail or tube;

Fig. 4 is a view of the saw and motor mounting from the right of Fig. 3, and the opposite side thereof from the showing in Fig. 2; and Fig. 5 is a partial detail view of the controls as locating the saw in inactive or retracted position for return idle transit back to starting position for then taking on a succeeding cutting traverse of the work.

The table

Figure 2:
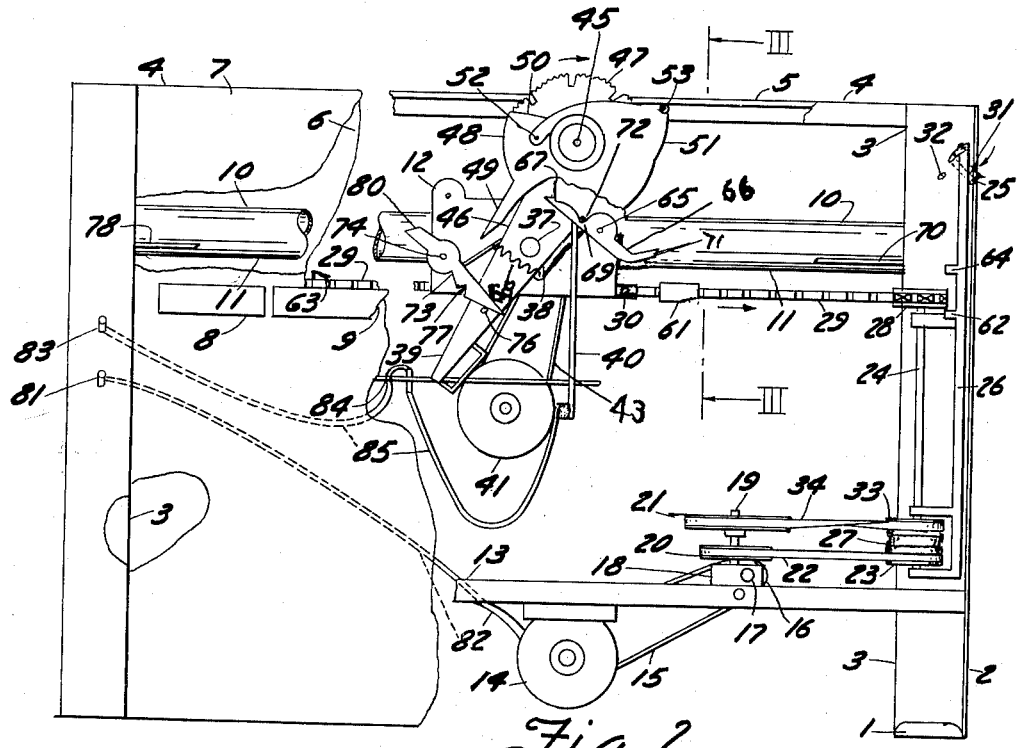
Fig. 2 is a fragmentary side elevation of the table of Fig. 1, showing features of the motor driven disk saw in its cutting direction course.

Base portions 1 have end plates 2 rising therefrom and centrally carrying vertical channels 3. Thereon is mounted a deck or table top 4 having lengthwise thereof and spaced slightly from one edge inward, a slot 5. Side enclosing sheets 6, 7 are provided. The sheet 7 nearer the slot 5 has a window region 8 with an inwardly extending vane 9 upwardly inclined (Fig. 3). This is located in a suitable position to receive sawdust and have it delivered clear of the under-the-table controls.

The monorail and saw carriage drive

Mounted between the end channels 3 and spaced down parallel with the table top or deck 4 is a guide tube or monorail 10 having a bottom rib 11. Movable along this unit 10, 11 is a carriage 12.

Parallel to the rail 10 and therebelow is a frame member or horizontal channel 13, also between the end channels 3. In order to allow clearway over this frame member 13, a motor 14 is mounted to depend therefrom. An endless belt 15 from the motor 14 drives a pulley 16 on a worm shaft 17 at a speed reduction gear box 18 having an upstanding shaft 19 therefrom extending upwardly from the frame member 13 and having fixed thereon a lower cutting course drive pulley 20 and an upper larger return course actuating pulley 21. A belt 22 from the pulley 20 drives a pulley 23 loose on a vertical shaft 24. Near the end of the table top 4 is a control handle 25, which as moved up, is effective thru a rod 26 to lift the pulley 23 into engagement with a clutch 27, thereby causing the belt 22 to drive a sprocket wheel 28 at the upper end of the shaft 24 to pull theretoward the forward reach of a sprocket chain 29 having an adjustable connection 30 with the carriage 12. By shifting the handle 25 away from a holding catch 31 therefor to a catch 32, the shaft or rod 26 is lowered, pulley 23 released, and a pulley 33 is brought to the clutch 27. Crossed belt 34 from the pulley 21 is now effective thru the pulley 33, shaft 24 and the sprocket wheel 28 to cause the carriage 12 to move away from the sprocket wheel 28.

The carriage, motor and saw unit

The carriage 12 has rollers 35 taking its load antifrictionally on the rail 10, while lower rollers 36 against the opposite sides of the rib 11 maintain the carriage upright for its side bearings 37 to support frame 38 rockably for said frame to swing in a vertical plane thru or parallel to the rail 10. Supplementing lower leg or arm 39 of the frame 38 are struts 40 to fix an electric motor 41 below the rail 10.

A pulley 42 is driven by the motor 41 and, as a transmission, extends upward by a belt 43 to a pulley 44 on a shaft 45 thru an upper arm 46 of the frame 38. The shaft 45 as extending thru the frame arm 46, has mounted thereon a disk saw 47. In the practice hereunder, a general shield or envelope 48 is about the lower portion of the saw blade 47 and has therefrom a deflector chute 49 in position at the range of adjustments for the saw 47 (Fig. 3), to deliver sawdust from the disk to the vane 9 for spill thru the window 8 out from the table housing, and thus clear of the carriage drive and control mechanism. Open top 50 of the shield 48 is adjustably reduced by a shield section 51 swinging from a pivot mounting 52 on the shield 48. Remote from the pivot 52, the section 51 has rollers 53 adapted to ride against the underside of the table top 4, as the blade 47 protrudes thru the slot 5. A spring 54 yieldably directs the rollers upward, so that in the direction of work cutting, there is an envelope for the blade 47 snugly up toward the table top 4. The high speed turning of the disk 47 into this envelope creates a suction for drawing the dust from the cuttings into the shield and clear of the work. This is an automatic supply for the chute 49.

Positioning the saw as to the work

Fixed with the frame 38 is a gear segment 55 (Fig. 4). A bearing 56 on the carrier 12 (Fig. 4) mounts the lower end of a worm shaft 57 having a hand wheel 58 thereon. A slotted arm 59 also mounted on the carrier 12 may be locked by a screw clamp 60 to hold the worm 57 in mesh with the segment 55. The frictional resistance of this adjustable connection is sufficient to hold the saw blade into or out of work as may be set thru the hand wheel 58.

The automatic cycle controls

Adjustably mounted on the sprocket chain 29 to travel in the cutting course toward the sprocket wheel 28 is a cam 61. Just before the blade 47 reaches the end of the slot 5, the cam 61 strikes a block 62 fixed with the rod 26, which pulls the handle 25 away from its holding clip 31 and releases the pulley 23 from the clutch 27. Instead of having the arm 25 stop at a mid neutral position, the cam 61 may operate the block 62 for shifting the handle 25 to the holding clip 32. Then clutch 27 is connected to the pulley 33 to reverse the direction of travel of the chain 29. The cam 61 rides back in this reversal without by so doing resetting the block 62.

When the carriage 12 has taken the blade 47 near to the opposite end of the slot 5, the other reach of the sprocket chain 29 in its travel toward the sprocket wheel 28 has adjustable cam clamp 63 thereon strike a block 64 on the rod 26. The handle 25 may be thereby snapped clear of the holding clip 32, and the pulley 33 be unclutched for the recover course to be discontinued. However, when the cam 63 is effective for a pull throw of the handle 25 to the holding clip 31, the pulley 23 is brought into driving position with the clutch 27 and the saw blade 47 is in its progress back toward the sprocket wheel 28.

Whether or not reversal of saw travel direction be produced by the cams in the controls, there may be cutting out of the blade 47 to remain above the table top 4 during the recover travel. A time interval may thus be saved for re-locating the work. To this end, the clamp 60 may be reset to shift the worm gear 57 clear of the segment 55.

On a pivot 65 of the housing or carriage 12 is a trigger 66 (Fig. 5) having a seat 67 normally thrust by a tension spring 68 to engage a pin 69 (Fig. 2) to hold the blade 47 in its position of upwardly projecting thru the slot 5.

Properly timed with the location of the adjustable cam 61, a finger 70 acts upon cam end 71 of the trigger 66 to rock the seat 67 clear of the pin 69, for the travel direction reversal of the motor 41, in its momentum with its mass and the mass of the blade 47 to allow the arm 46 to move the pin 69 into a seat 72 of the trigger 66. The contour of the face of the trigger 66 between the seats 67 and 72 coacts in determining this swinging of the blade 47 downward sufficiently not to project upward thru the slot 5 of the table top 4. The table top 4 is thus a clearway for the operator to move the sheet stock into the desired position over the slot 5 for a succeeding cutting or sawing operation.

Supplementing this control rocking of the frame 38, is a second trigger 73 having pivot bearing 74 on the carriage 12. The tension of the spring 68 holds the trigger 73 against a pin 76 on the frame arm 39. This makes the course of less resistance for the rocking of the frame 38 to lower the blade 47. The movement of the arm 39 along the cam face of the trigger 73 is to locate the pin 76 in a seat 77. This means that for the retraction course of the blade 47, it is held in its below-the-table top out-of-use position in the reverse transit until the cam 63 makes the cut-in for the sawing course back. The location of this cam 63 is timed with a fixed finger 78 carried by the frame adjacent follower sprocket wheel 79 for the chain 29. The finger 78 strikes a cam end 80 of the trigger 73 to rock it against the action of the spring 68 clear of the pin 76, and the general momentum reversal here at the higher lineal travel rate than that of cutting, due to the larger pulley 21, at once rocks the frame 38 to shift the blade 47 upward to protrude thru the slot 5 into cutting position.

Conveniently near an end of the table there is a switch 81 for starting and stopping the motor 14 thru electric conduit 82 thereto. A second switch 83 has electrical conductor means 85 with sufficient slack therein to hang over a rod 84 in providing connection to the motor 41.

Figure 1:
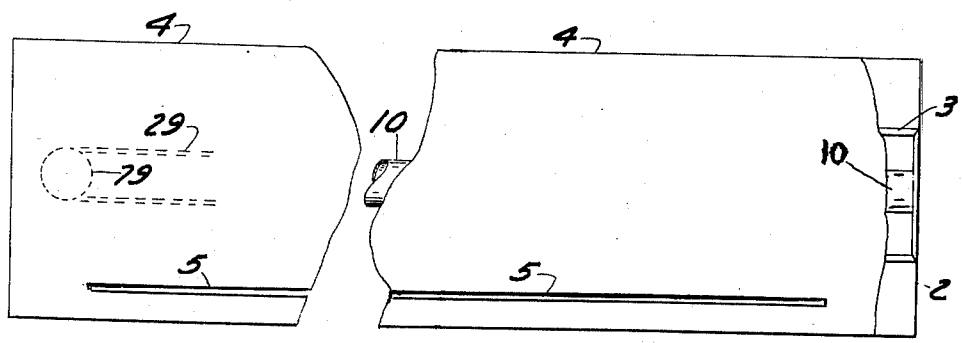
Fig. 1 is a plan view, with parts broken away, of a table upon which the work may be placed, and thru the deck of which the saw may extend.

The power saw of the disclosure herein is adapted for use in production programs, as well as readily to respond to job shop operations. In the former, there may occur the automatic cycle repetition, with placement of the work to be synchronized therewith, whether manual or automatic. However, the major utility arises from being possible readily to adapt the tool to the cutting job at hand. For instance with short cuts, there is no requirement for full transit the entire length of the slot 5. As the saw blade 47 completes its traverse thru the work, whether or not it be to the end of the slot 5 at the right of Fig. 1, the handle 31 may be shoved downward. Whether this shifting of the clutch 27 be manual or automatic, it may be just partial to stop the travel of the carriage 12. Experience has it that the operator generally desires the carriage 12 back to the left or starting end of the slot 5. Accordingly, the down shifting of the handle 31 with the clutch 27 up is usually effective for connecting the transmission 21, 34, 33, to move the carriage 12 to the left end of the slot 5. Conveniently, the carriage may come to rest. However, if such be not in the program, the operator may pull up, even at this interval, more vigorously upon the handle 31. The response is for the clutch 27 to connect in the transmission 20, 22, 23, for the cutting direction of travel starting for the blade 47 to the right in the slot (Fig. 1). It is thus to be seen, that without material disturbance of the automatic features, manual control may be adopted.

The hand wheel 58, in its adjustment, may determine the height of the blade 47 to project above the table 4, for its cutting operation. Furthermore, with the hand wheel 58 effective thru the worm 57 and the segment 55 to lock the lever frame 38, the trigger controls are nullified. Accordingly, as the extent of upward projection of the blade 47 be acceptably established by the triggers 66, 73, the arm 59 may release the worm 57 from the segment 55 and be so held by the clamp 60. This allows the trigger 66, not only to effect the automatic stop at the cutting limit, but to have the blade 47 lowered relatively to the table top 5 during retraction, to allow work to be set.

What is claimed and it is desired to secure by Letters Patent is:

1. Machine tool equipment comprising a rotary tool, a motor, a frame assembling the tool and motor as a unit, a carriage providing pivotal mounting for the frame, a track for the carriage, a transmission connection for moving the carriage along the track, and control mechanism including a trigger coacting between the frame and carriage in one direction of carriage travel along the track to rock the frame on the carriage, and a finger, near a terminal position of the track, to be there engaged by and to act thru the trigger to rock the frame.

2. Machine tool equipment comprising a rotary tool, a motor, a frame assembling the tool and motor as a unit, a carriage providing pivotal mounting for the frame, a track for the carriage, a transmission connection for moving the carriage along the track, and control mechanism including a pair of triggers, and spaced fingers along the track to leave an operation clearance for tool functioning therebetween, one of said fingers coacting with one of the triggers for rocking the frame relatively to the carriage for tool working progress along the track, and the other finger coacting with the other trigger for retracting the rocking frame for tool return to carry thru for a succeeding cycle of working progress.

LESTER L. GRANT.

REFERENCES CITED

The following references are of record in the file of this patent:

UNITED STATES PATENTS

| Number | Name | Date |
|---|---|---|
| Re. 20,687 | Grozier | Apr. 5, 1938 |
| 226,904 | Culver | Apr. 27, 1880 |
| 419,848 | Greenlee | Jan. 21, 1890 |
| 714,314 | Luther | Nov. 25, 1902 |
| 1,057,471 | Westman | Apr. 1, 1912 |
| 1,139,808 | Ryckman | May 18, 1915 |
| 1,528,535 | De Walt | Mar. 3, 1925 |
| 1,586,494 | Walker | May 25, 1926 |
| 1,797,907 | Drysdale | Mar. 24, 1931 |
| 1,813,435 | Bentz | July 7, 1931 |
| 1,830,151 | Wilderson | Nov. 3, 1931 |
| 1,842,114 | Pratt | Jan. 19, 1932 |
| 1,888,679 | Knapp | Nov. 22, 1932 |
| 1,988,102 | Woodward | Jan. 15, 1935 |
| 2,044,481 | Manley et al. | June 16, 1936 |
| 2,062,969 | Dutcher | Dec. 1, 1936 |
| 2,142,303 | Crouch | Jan. 3, 1939 |
| 2,258,828 | Trebert | Oct. 14, 1941 |
| 2,496,613 | Woodward | Feb. 7, 1950 |

FOREIGN PATENTS

| Number | Country | Date |
|---|---|---|
| 136,657 | Great Britain | Dec. 23, 1919 |
| 447,663 | Germany | July 30, 1927 |